(12) United States Patent
Liebheit (10) Patent No.: US 8,807,912 B2
(45) Date of Patent: Aug. 19, 2014

(54) INFEED STATION AND STACK GRIPPER OF A PALLETIZING SYSTEM AND METHOD FOR TRANSFERRING STACKS FROM AN INFEED STATION TO A STACK GRIPPER

(75) Inventor: Stefan Liebheit, Staufen (CH)

(73) Assignee: Müller Martini Holding AG, Hergiswil (CH)

( * ) Notice: Subject to any disclaimer, the term of this patent is extended or adjusted under 35 U.S.C. 154(b) by 20 days.

(21) Appl. No.: 12/384,978

(22) Filed: Apr. 9, 2009

(65) Prior Publication Data
US 2009/0263229 A1   Oct. 22, 2009

(30) Foreign Application Priority Data

Apr. 17, 2008   (EP) ..................................... 08405108

(51) Int. Cl.
*B65H 31/30* (2006.01)
*B65F 9/00* (2006.01)
*B65G 47/90* (2006.01)
*B65G 61/00* (2006.01)

(52) U.S. Cl.
USPC ..................... 414/790.2; 414/788.9; 414/799; 414/900; 294/103.1

(58) Field of Classification Search
USPC ......... 198/419.1, 429, 463.4, 774.1; 414/277, 414/279–281, 495, 497, 622, 788.9, 789.9, 414/790.2–790.4, 792.9, 794.3, 794.7, 414/795.7, 796, 796.2, 796.9, 799, 907
See application file for complete search history.

(56) References Cited

U.S. PATENT DOCUMENTS

| | | | | |
|---|---|---|---|---|
| 3,381,829 A | * | 5/1968 | Turner | 414/793.9 |
| 3,767,065 A | * | 10/1973 | Hall et al. | 414/790.2 |
| 4,055,245 A | * | 10/1977 | Sundberg | 414/788.3 |
| 4,178,118 A | * | 12/1979 | Bailey | 414/788 |
| 4,212,579 A | * | 7/1980 | Stromberg | 414/789.9 |
| 4,383,788 A | * | 5/1983 | Sylvander | 414/792.9 |
| 4,618,054 A | * | 10/1986 | Muller | 198/409 |
| 4,787,810 A | * | 11/1988 | Cawley et al. | 414/591 |
| 4,818,171 A | * | 4/1989 | Burkholder | 414/497 |
| 5,042,862 A | * | 8/1991 | Tubke | 294/86.4 |
| 5,087,169 A | * | 2/1992 | Tubke | 414/792.9 |

(Continued)

FOREIGN PATENT DOCUMENTS

| | | |
|---|---|---|
| EP | 1 801 047 | 6/2007 |
| JP | 02127637 | 10/1990 |
| JP | 07002333 | 1/1995 |
| JP | 2002029628 | 1/2002 |

*Primary Examiner* — Gregory Adams
(74) *Attorney, Agent, or Firm* — Lucas & Mercanti, LLP; Klaus P. Stoffel (57) ABSTRACT

An infeed station has a carriage that is supported on a machine frame of the infeed station in a way that allows it to be moved laterally and a stack conveyor mounted on the carriage for conveying stacks from an infeed position to a transfer position, from which the stacks can each be removed by the stack gripper. The stacks can be centered in two stack chambers, which are arranged side by side on the carriage. A stop element supported on the carriage is assigned to each stack chamber and can be moved between a working position and a retracted position, such that in their working position, the stop elements project into the associated stack chamber in such a way that the stacks can be moved by the stack gripper from a forward holding position of the transfer position towards the stop elements and placed against the stop elements. The stacks positioned on the stop elements are gripped by the stack gripper between a finger and pressing means and conveyed to a pallet.

11 Claims, 10 Drawing Sheets

(56) References Cited

U.S. PATENT DOCUMENTS

| | | | |
|---|---|---|---|
| 5,335,903 A * | 8/1994 | Martin et al. | 271/157 |
| 5,415,518 A * | 5/1995 | Montgomery | 414/791.6 |
| 5,827,039 A * | 10/1998 | Gammerler | 414/744.6 |
| 5,878,864 A * | 3/1999 | Feldkamper | 198/409 |
| 5,944,479 A * | 8/1999 | Kanaya et al. | 414/791.6 |
| 6,398,107 B1 * | 6/2002 | Neri | 235/379 |
| 6,804,939 B2 * | 10/2004 | Samborn et al. | 53/493 |
| 6,871,893 B2 * | 3/2005 | Langston et al. | 294/113 |
| 2007/0154292 A1 * | 7/2007 | Gammerler et al. | 414/286 |
| 2009/0238672 A1 * | 9/2009 | Ryf et al. | 414/799 |

* cited by examiner

INFEED STATION AND STACK GRIPPER OF A PALLETIZING SYSTEM AND METHOD FOR TRANSFERRING STACKS FROM AN INFEED STATION TO A STACK GRIPPER

BACKGROUND OF THE INVENTION

1. Field of the Invention

The present invention relates to an infeed station and a stack gripper of a palletizing system. This equipment indicates a carriage that is supported on a machine frame of the infeed station in a way that allows it to be moved laterally; a stack conveyor mounted on the carriage for conveying stacks from an infeed position to a transfer position, from which the stacks can each be removed by the stack gripper; at least two stack chambers arranged side by side on the carriage which the stacks can be centered, and a control unit. The invention also relates to a method for transferring stacks from an infeed station to a stack gripper.

2. Description of the Related Art

Palletizing systems for palletizing stacks, which have an infeed station and a stack gripper, are well known from the prior art. The infeed station has two stack chambers on a carriage, and individual stacks can be set down in these chambers by a conveyance device. These stacks are conveyed one at a time by the stack conveyance device to a transfer position, where they are picked up by the stack gripper, which then places them on a pallet. To allow exact palletization, it is essential that the stacks be exactly positioned on the stack gripper. To ensure exact transfer of the stacks to the stack gripper, the stacks can be centered in the stack chamber before the transfer. In addition, in a previously known infeed station, an ejection device is provided, which is rigidly connected with the machine frame and with which the stacks can be pushed one at a time out of the infeed station into the stack gripper.

Moreover, EP 180 10 47 A discloses an infeed station in which the ejection device is supported on a carriage. The ejection device has an ejection plate for each stack chamber. The ejection plates serve the purpose of pushing the stacks onto the stack gripper. The ejection plates must be moved horizontally as well as vertically for each transfer, which requires a comparatively complicated design comprising many parts.

SUMMARY OF THE INVENTION

It is the object of the present invention to create an infeed station and a stack gripper of the general type described above, which can be manufactured more simply but still allows exact positioning of the stacks on the stack gripper.

In accordance with the invention, this object is achieved by virtue of the fact that a stop element supported on the carriage is assigned to each stack chamber and can be moved between a working position and a retracted position. In this regard, in their working position, the stop elements project into the associated stack chamber in such a way that the stacks can be moved by the stack gripper from a forward holding position of the transfer position towards the stop elements and placed against the stop elements.

In contrast to the prior-art ejection plates, the stop elements do not have to be moved horizontally when the stack is transferred to the stack gripper. The stacks are thus moved against an upright stop. The direction of movement during this moving operation is opposite the usual direction of conveyance of the stack conveyor. During a stack transfer, it is thus merely necessary to move the stop elements from their retracted position into their working position and then back to their retracted position. The drive and control of stop elements of this type are much simpler than the drive and control of the previously known ejection device. Therefore, the carriage of the infeed station can be manufactured with a lower weight and fewer individual parts, and this makes it possible to lower manufacturing costs significantly.

In accordance with a further development of the invention, it is provided that the stop elements can be adjusted in the longitudinal direction of the associated stack conveyor. This adjustability is not for the purpose of moving the stacks but rather serves only for setting a suitable position of the corresponding stop element during a format change of the stacks. An adjustment of this type can be made comparatively simply, for example, with a spindle. The stop elements are preferably positioned on the carriage in such a way that, in their working position, they are separated from the stack by a comparatively small distance. The stacks must then be moved by the stack gripper a comparatively small distance until they rest against the corresponding stop element.

In a further development of the invention, it is provided that each of the stop elements has a sensor, with which is can be determined whether a stack has passed completely over a given stop element that is in its retracted position. This makes it possible to ensure that the given stop element is moved into its working position at a certain distance from the rear end of the stack. The given stop element can thus be moved immediately into the working position as soon as the sensor detects that the stack has moved completely over this stop element. The sensor relays a corresponding signal to the control device, which then suitably effects the movement of the stop element from the retracted position into the working position. A sensor of this type can also be used to detect possible disturbances in the infeed station.

In accordance with a further development of the invention, the stop elements consist of two rod-like, vertically extending parts that are arranged some distance apart. In the working position, each of these parts projects through a gap formed in the stack conveyor. During the positioning of a stack on the corresponding stop element or on the two rod-like parts, reverse movement of the stack conveyor can be used to assist the movement of the stack gripper. Exact alignment on the aforesaid two parts is possible in this operation. The positioning of each stack transversely to the direction of conveyance is effected by centering means of the corresponding stack chamber. The centering means consist especially of displaceable sidewalls.

In the method of the invention, the stacks or a single stack is moved by the stack conveyor into a forward holding position and each of the stop elements is then moved out of its retracted position and into its working position a certain distance from the rear end of the stack. The stack or stacks are then pushed towards the stop element or elements until they come to rest against them. The holding position is the position in which the stack has passed completely over the corresponding stop element. The corresponding stack is positioned by a pushing movement of the stack gripper and preferably a simultaneous reverse movement of the stack conveyor. The aforementioned monitoring of the stacks by means of a sensor allows these sequences of operations to be carried out very quickly and precisely. Since the stop elements are supported on the carriage, the carriage can be moved transversely to the direction of conveyance to feed the two stack chambers, as in the prior art.

In another possible method, one of the two stack chambers is widened to allow the transfer of an especially large stack, so that in this stack chamber, the stack can be positioned against both stop elements. Accordingly, to convey this especially large stack in the aforesaid stack chamber, parts of the stack conveyor are used which otherwise are assigned to the other stack chamber. Here too, it is advantageous for the pushing movement of the stack gripper on the stack to be assisted by reverse movement of the stack conveyor.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
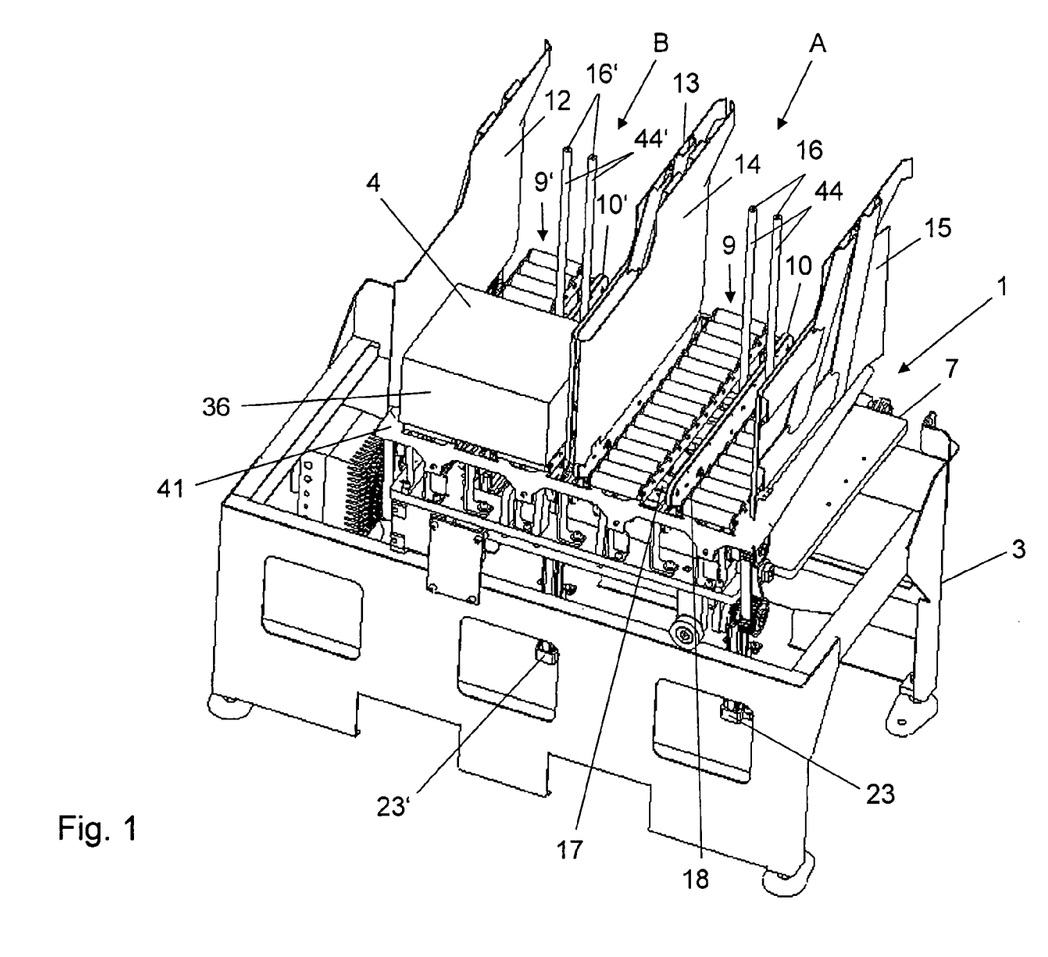
FIG. 1 is a schematic perspective view of an infeed station, with some parts left out for the sake of clarity.
Figure 2:
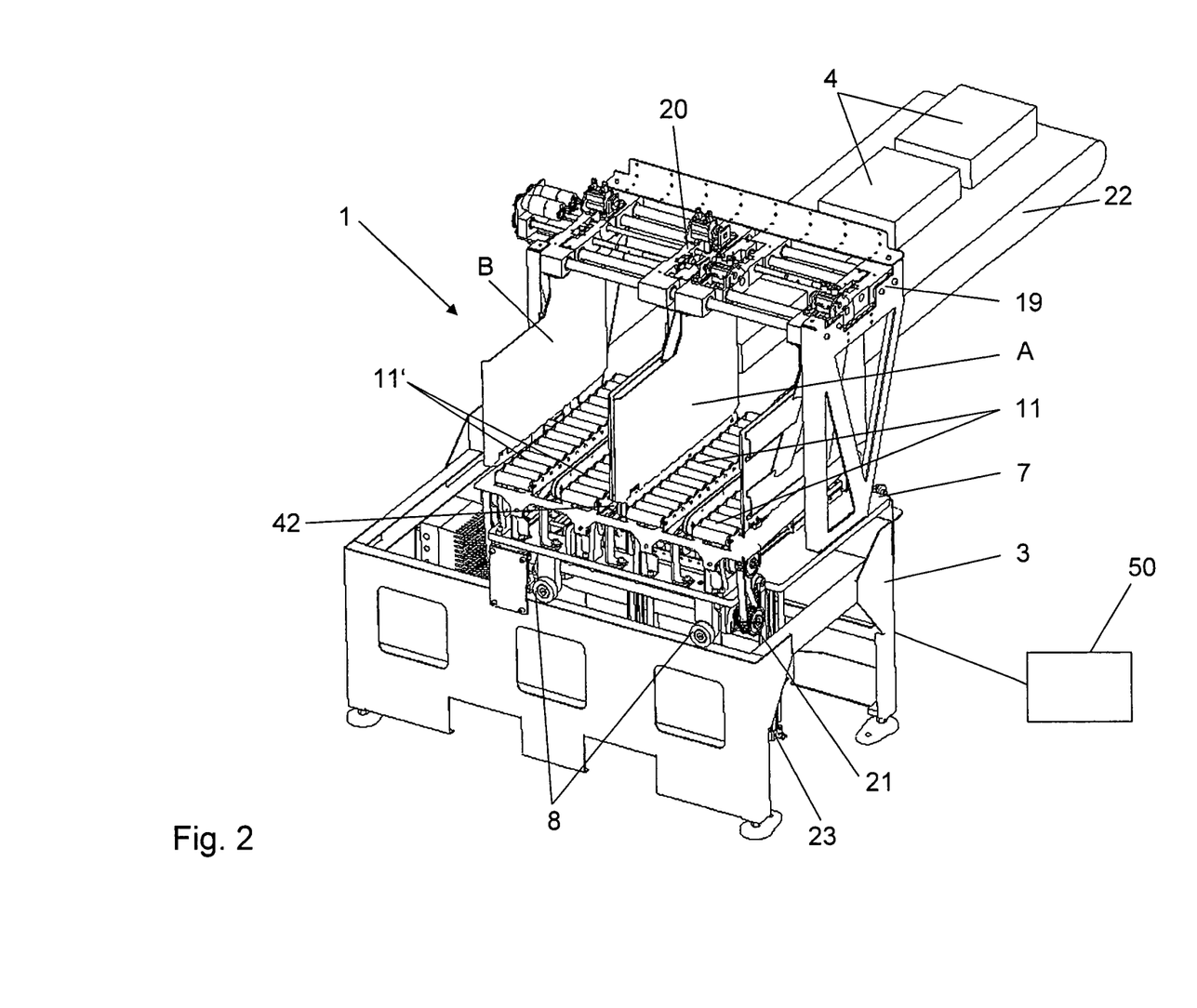
FIG. 2 shows another view of the infeed station.

As FIGS. 1 and 2 show, the infeed station 1 of a palletizing system has a machine frame 3, on which a carriage 7 is supported. This carriage 7 is capable of controlled displacement on rollers transversely to the direction of conveyance of a stack conveyor 9, 9' as well as transversely to the direction of conveyance of a transport device 22, which is shown in FIG. 2. In the position of the carriage 7 shown in FIG. 2, a stack chamber B of the infeed station 1 is positioned in such a way that stacks 4 conveyed on the transport device 22 can be set down in this stack chamber B. In another position (not shown) of the carriage 7, a stack chamber A of the infeed station 1 is positioned in such a way in front of the transport device 22 that stacks 4 can be set down in this stack chamber A. The transport device 22 is thus stationary, while the carriage 7 can be moved. The two stack chambers A and B can thus each be successively loaded with a stack 4.

Figure 4:
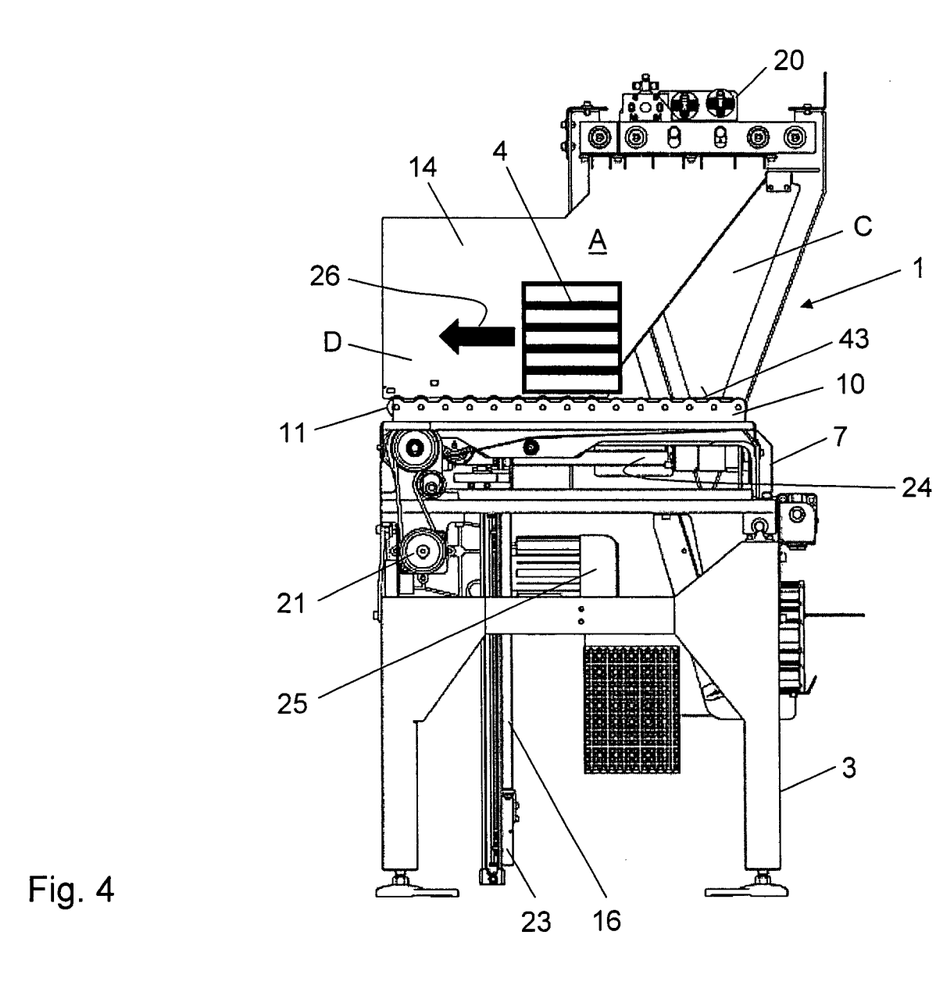
FIGS. 4 to 9 are additional views with different phases of the transfer of a stack to the gripper.

Each of the stack chambers A and B has an associated stack conveyor 9, 9', with which each stack 4 can be conveyed in the respective stack chamber A or B from an infeed position C to a transfer position D (FIG. 4). The stack 4 shown FIG. 1 is located in the transfer position D. In this position, the forward end 36 of the stack 4 is essentially flush with the front end 41 of the carriage 7. The stack 4 at the rear end of the stack conveyor 9, 9' is located in the infeed position C. The two stack conveyors 9, 9' each consist of a belt conveyor 10 or 10' and two rows of rollers 11 or 11' that run parallel to the belt conveyor. Another belt conveyor 42 is located between the two aforesaid belt conveyors 10 and 10'. The rollers 11 and 11' are also driven. A drive system 21, which is connected with a motor 25 (FIG. 4), is provided for driving the belt conveyors 10, 10' and 42 and the rollers 11 and 11'.

The stack chamber A has two centering walls 14 and 15, and stack chamber B has two centering walls 12 and 13, which have a plate-like design and are supported on a support 19 in such a way that they can be horizontally displaced transversely to the direction of transport by means of a displacement device 20. In the position shown in FIGS. 1 and 2, the centering walls 12 to 15 are arranged in such a way that the two stack chambers A and B are essentially equally wide, so that essentially equally wide stacks 4 can be conveyed in the stack chambers A and B. Accordingly, two stacks 4 can then be supplied in the transfer position D and can be simultaneously gripped and palletized by the stack gripper 2. However, the centering walls 12 to 15 can be displaced by means of the displacement device 20 under automatic motor control in such a way that, for example, the stack chamber A is made sufficiently wide that an especially wide stack 4' can be conveyed in the stack chamber A by means of the belt conveyors 10' and 42 and the rollers 11 and 11' from the infeed position C to the transfer position D. In this case, only the stack 4' is gripped by the stack gripper 2 and palletized. However, the adjustability of the centering walls 12 to 15 and thus of the stack chambers A, B is not essential to the present invention.

Two stop elements 16 and 16' are supported on the carriage 7 and can each be moved by an actuating cylinder 23, 23' between a retracted position and a working position. In FIGS. 1 and 2, the stop elements 16 and 16' are shown in the working position. In this position, the stop elements 16 and 16' extend into the stack chambers A and B, respectively. In the retracted position, which is also known as the rest position, the stop elements 16 and 16' are located beneath the upper side 43 (see FIG. 4) of the stack conveyor 9 and 9', respectively. The stop elements 16 and 16' can be moved in or opposite the direction of conveyance by the spindle 24 (also shown in FIG. 4) to adjust to the format of the stacks 4, 4'.

As FIG. 1 shows, the stop elements 16 and 16' each have two rod-like, vertically extending parts 44 and 44', respectively, which are arranged some distance apart. In their working position, these parts 44 and 44' project through gaps 17 and 18, which, as FIG. 1 shows, extend left and right of the belt conveyor 10 and 10'. The gaps 17 and 18 are located between the belt conveyor 10, 10' and the rollers 11 and 11' and extend over the entire length of the infeed station 1. The actuating cylinders 23, 23' and the spindle 24 are controlled by a control device 50, which is shown in FIG. 2. The movements between the retracted position and the working position as well as the movement by means of the spindle 24 are thus automatically controlled.

Figure 3:
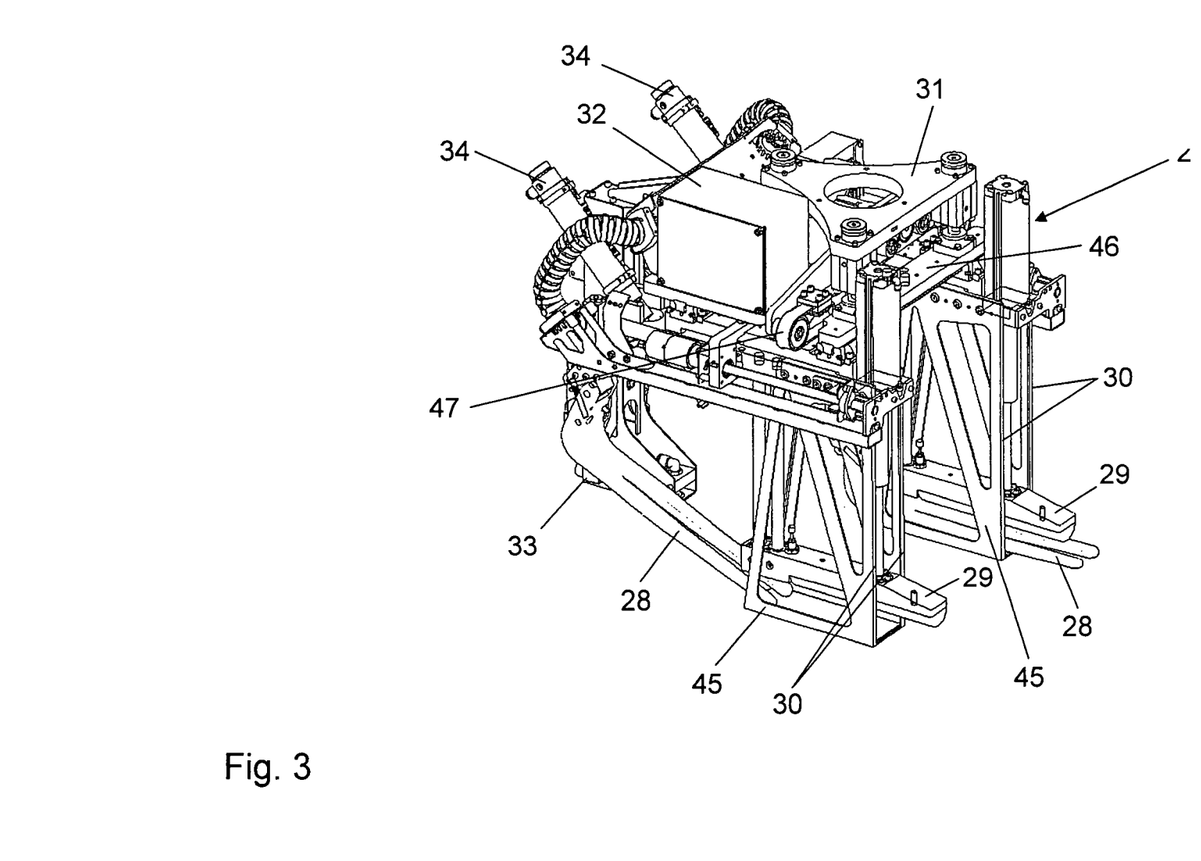
FIG. 3 shows a perspective view of the stack gripper.
Figure 10:
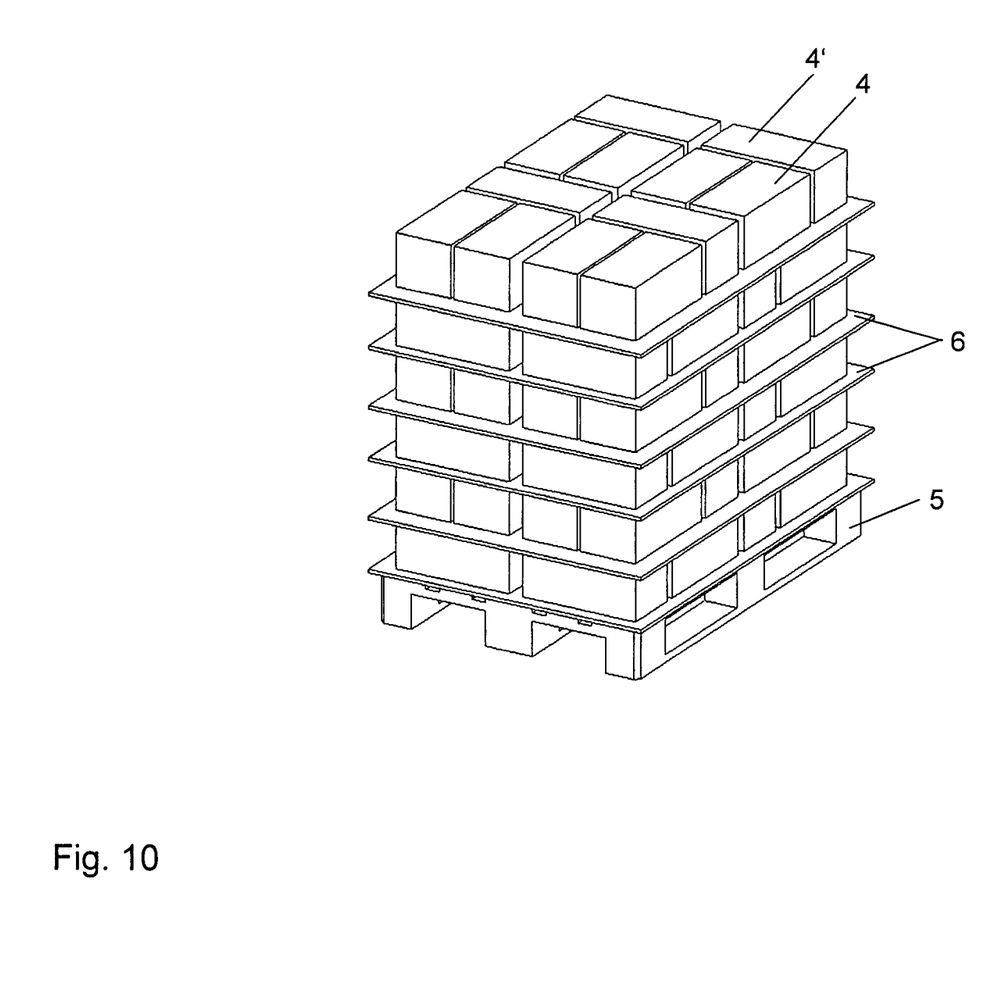
FIG. 10 is a perspective view of a loaded pallet.

The stack gripper 2 shown in FIG. 3 grips and palletizes the stacks 4 one at a time or in pairs, so that finally the stacks 4 are arranged on a pallet 5, as shown in FIG. 10, and can be transported in palletized form. Stacks 4 and 4' with different formats are palletized in FIG. 10. It is also basically possible to palletize stacks 4 that are all the same or stacks with more than two different formats. Cardboard separators 6 can be provided between the tiers of stacks by means that are already well known. The cardboard separators 6 can be gripped by the separator gripper 33 shown in FIG. 3 and removed from a magazine that holds them and then placed on each completed tier of stacks 4. The stack gripper 2 can be moved in all directions in space between the pallet 5 and the infeed station 1 with a device (not shown here). To allow it to be mounted on this device, the stack gripper 2 has a mounting plate 31, below which a guide beam 46 is mounted. Two frame parts 45 are supported on the latter and can be moved relative to each other by means of a drive system 47. The distance between the two frame parts 45 can thus be adjusted. The frame parts 45 have a box-like design and are open at the front. Each frame part 45 two stop edges 30 at its front end. Pressing means 29, which can be vertically adjusted, project beyond the stop edges 30. Each of these pressing means 29 cooperates with a finger 28 to grip a stack 4 or 4'. The fingers 28 can each be moved by an actuating cylinder 34 between the working position shown on the right in FIG. 3 and the retracted position shown on the left. A stack can be gripped between a finger 28 and pressing means 29. During this operation, the stack 4 is positioned on the two associated stop edges 30. Especially large stacks 4' can be simultaneously gripped with both fingers 28 and both pressing means 29. Accordingly, the stack 4' then lies against all four stop edges 30. The movements of the pressing means 29, the fingers 28, and the cardboard separator gripper 33 are controlled by a control device 32 that interacts with the control device 50 of the infeed station 1. Naturally, the stack gripper can also be controlled exclusively by the control device 50 of the infeed station 1, i.e., in this case, the palletizing system has a single common control device.

The transfer of stacks from the infeed station 1 to the stack gripper 2 will now be explained in greater detail with reference to FIGS. 4 to 9. FIG. 4 shows the conveyance of a stack 4 in the stack chamber A of the infeed station 1 in the direction of the arrow 26 from the infeed position C to the transfer position D. The stack thus moves from right to left in FIG. 4. The stack 4 is conveyed with the belt conveyor 10 and the rollers 11, which convey the stack 4 to the holding position shown in FIG. 5. In this holding position, the forward end 36 of the stack 4 is basically flush with the front end 41 of the carriage 7. The forward end 36 and the rear end 37 of the stack 4 are formed by a large number of printed products 35, which are laid horizontally one above the other to form the stack 4. The printed products 35 can be held together, for example, with film or straps (not shown). However, this is not absolutely necessary.

Figure 5:
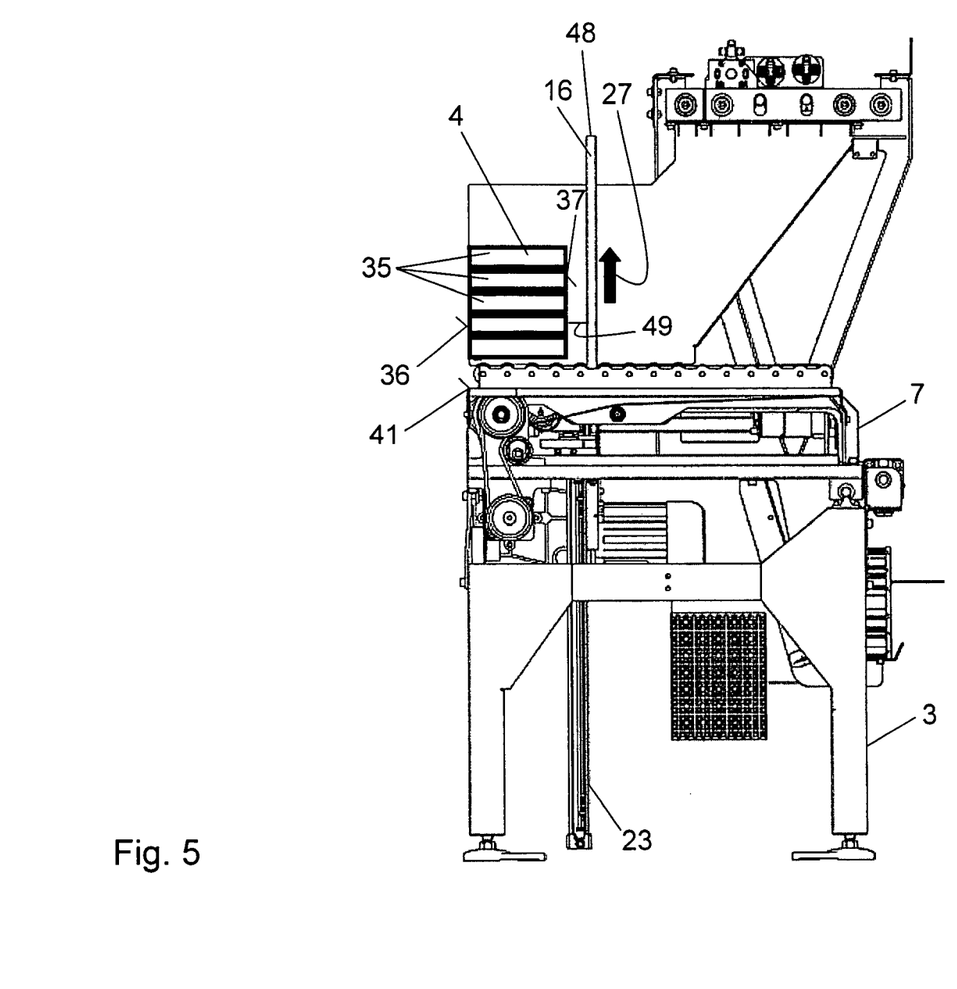

When the stack 4 is moved from the position shown in FIG. 4 to the holding position shown in FIG. 5, it travels over the stop element 16, which is in its retracted position. This passage of the stack over the stop element 16 is monitored with a sensor 48. As FIG. 5 shows, the sensor 48 is located at the upper end of the stop element 16. The sensor 48 can be, for example, an optical or electric sensor. As soon as the rear end 37 of the stack 4 has passed over the sensor 48, this is recorded by the sensor 48 or by the control device 50, which is connected with the sensor 48. The stop element 16 is then moved from the retracted position shown in FIG. 4 into the working position shown in FIG. 5. This movement from below to above is indicated in FIG. 5 by the arrow 27. As shown in FIG. 5, the rear end 37 of the stack 4 and the extended stop element 16 are separated by a distance 49, which is relatively small compared to the length of the stack 4 and may be, for example, a few centimeters. In principle, it would also be possible to have an arrangement of the stop elements 16 and 16' in which they can be moved downward into the working position from above and can then be moved upward into the retracted position. Lateral displacement of the stop elements 16 and 16' between the working position and the retracted position is also conceivable.

Figure 6:
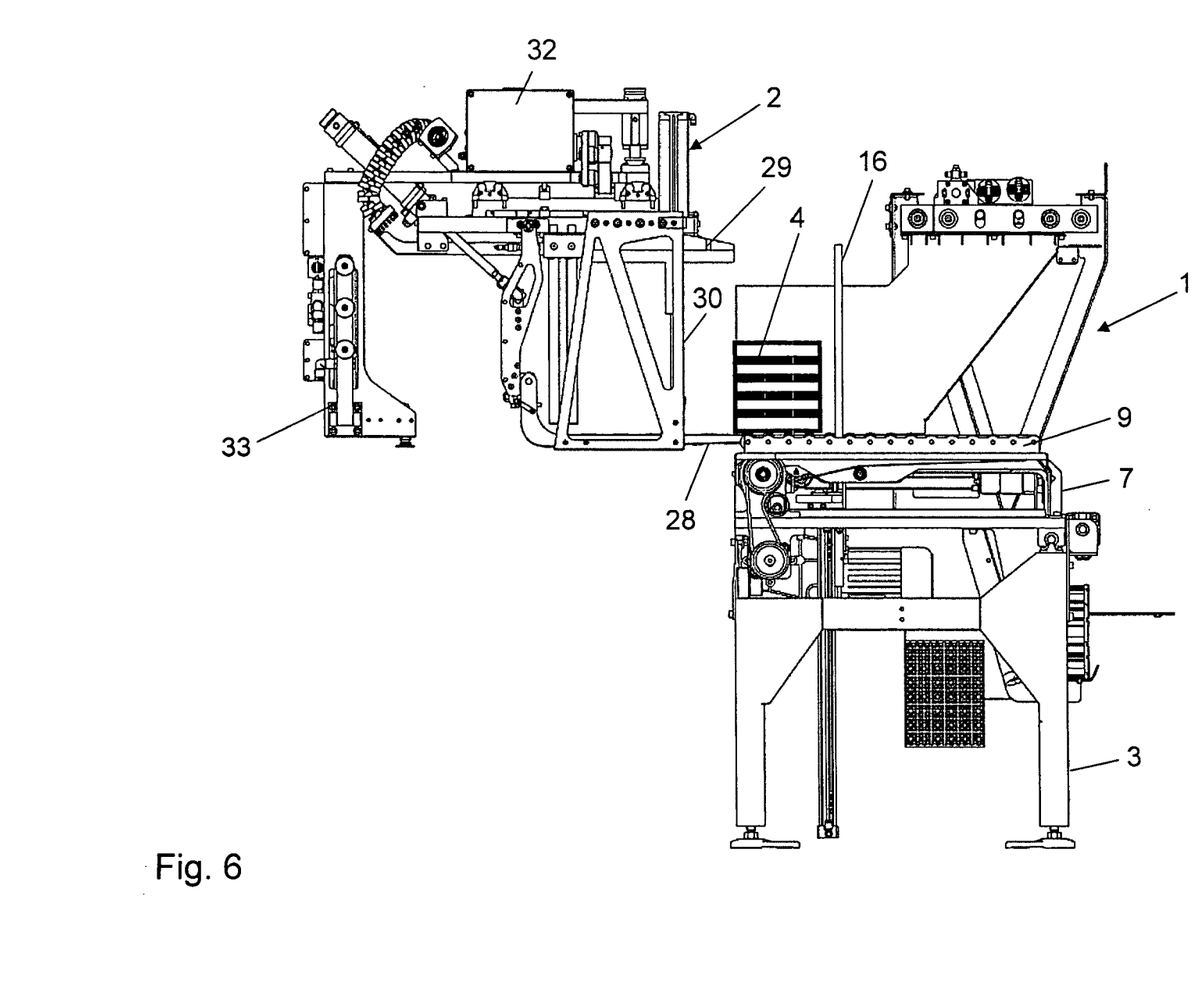
Figure 7:
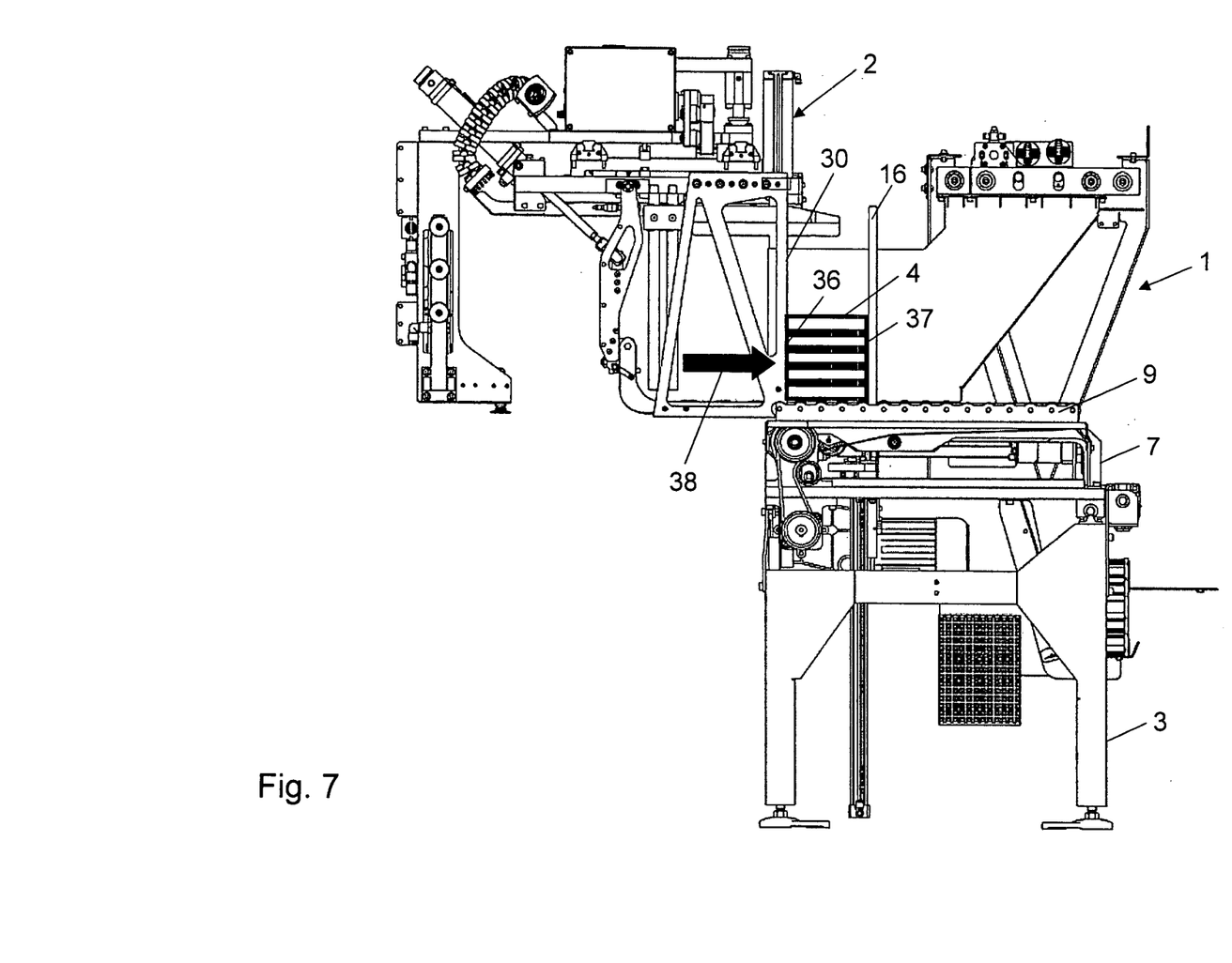

To pick up the stack 4 from the infeed station 1, the stack gripper 2 is first moved into the position shown in FIG. 6. In this operation, the stack gripper 2 is positioned and moved in such a way that its fingers 28 enter the gaps 17 and 18 of the stack conveyor 9 beneath the stack 4. As shown in the drawing, the pressing means 29 is in a raised position at this time. As FIG. 7 shows, the stack gripper 2 is then moved farther in the direction of the arrow 38 until its stop edges 30 rest against the forward end 36 of the stack 4. Continued movement of the stack gripper 2 in the direction of arrow 38 then moves the stack against the stop element 16 until the rear end 37 of the stack 4 rests against the stop element 16. During this operation, the movement of the stack 4 against the stop element 16 can be assisted by reverse movement of the belt conveyor 10 and the rollers 11 of the stack conveyor 9. The stack 4 is centered with the centering walls 14 and 15. However, it is also possible for this centering to be effected before the position shown in FIG. 7.

Figure 8:
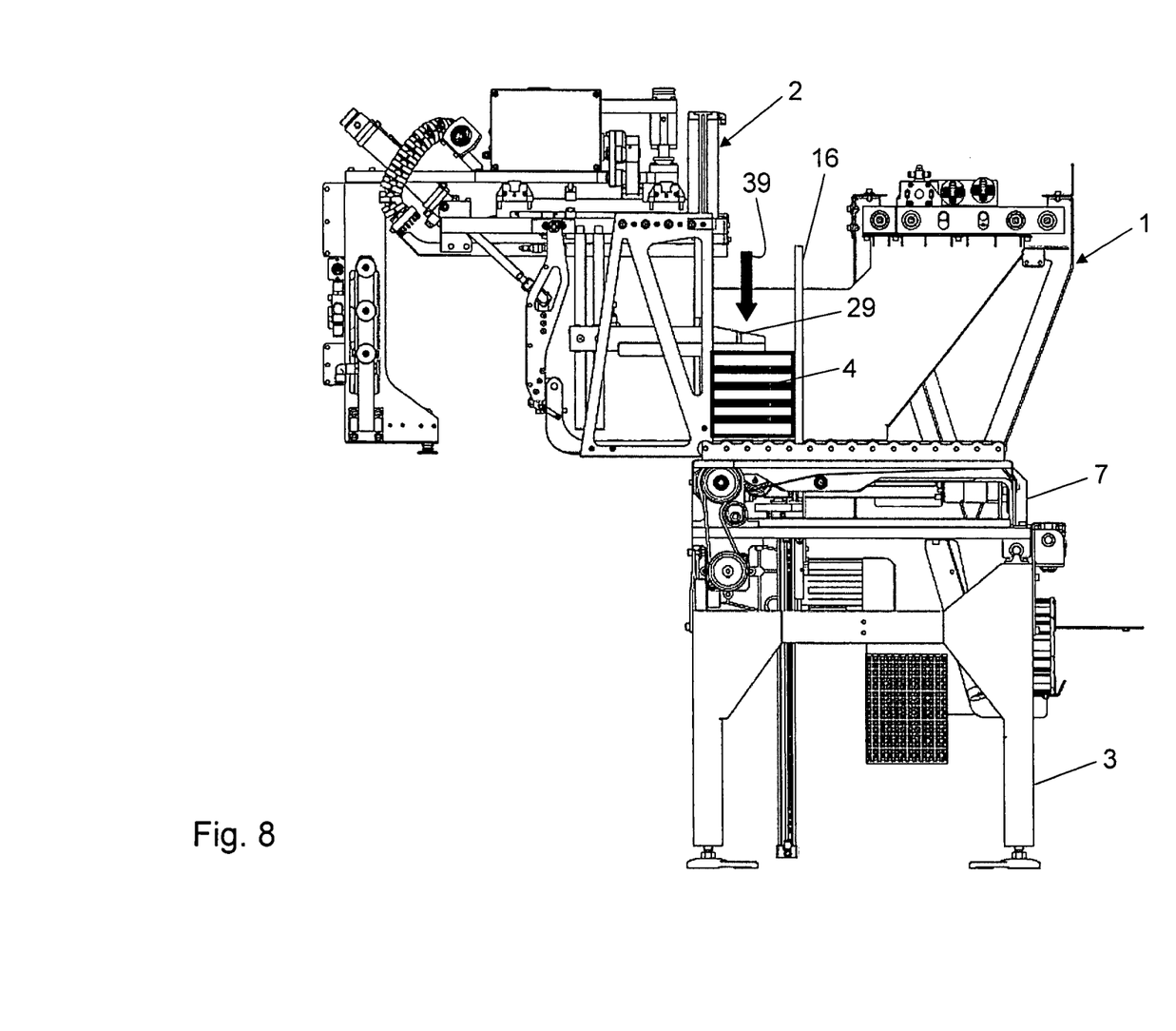

If the forward end 36 of the stack 4 rests against the stop edges 30 of the stack gripper 2, and the rear end 37 of the stack 4 rests against the stop element 16, then the pressing means 29 is lowered in the direction of the arrow 39, as shown in FIG. 8, so that finally the stack 4 is held tightly between the pressing means 29 and the finger 28. The other stack 4 that was conveyed in the other stack chamber B but is not shown here is picked up in the same way by the stack gripper 2. In this operation, all of the movements can be carried out parallel to each other and at the same time. In FIG. 8, two stacks 4 are thus positioned and held on the stack gripper 2 with one pressing means 29 and one finger 28 each. Alternatively, a single stack 4' can be held by two fingers 28 and two pressing means 29. This stack 4' can be moved in the same way as described above for the two stacks 4. As FIG. 9 shows, the stop elements 16 and 16' are then moved into the retracted position in the direction of the arrow 40, so that the following stacks 4 can be conveyed to the transfer position D of the infeed station 1.

Figure 9:
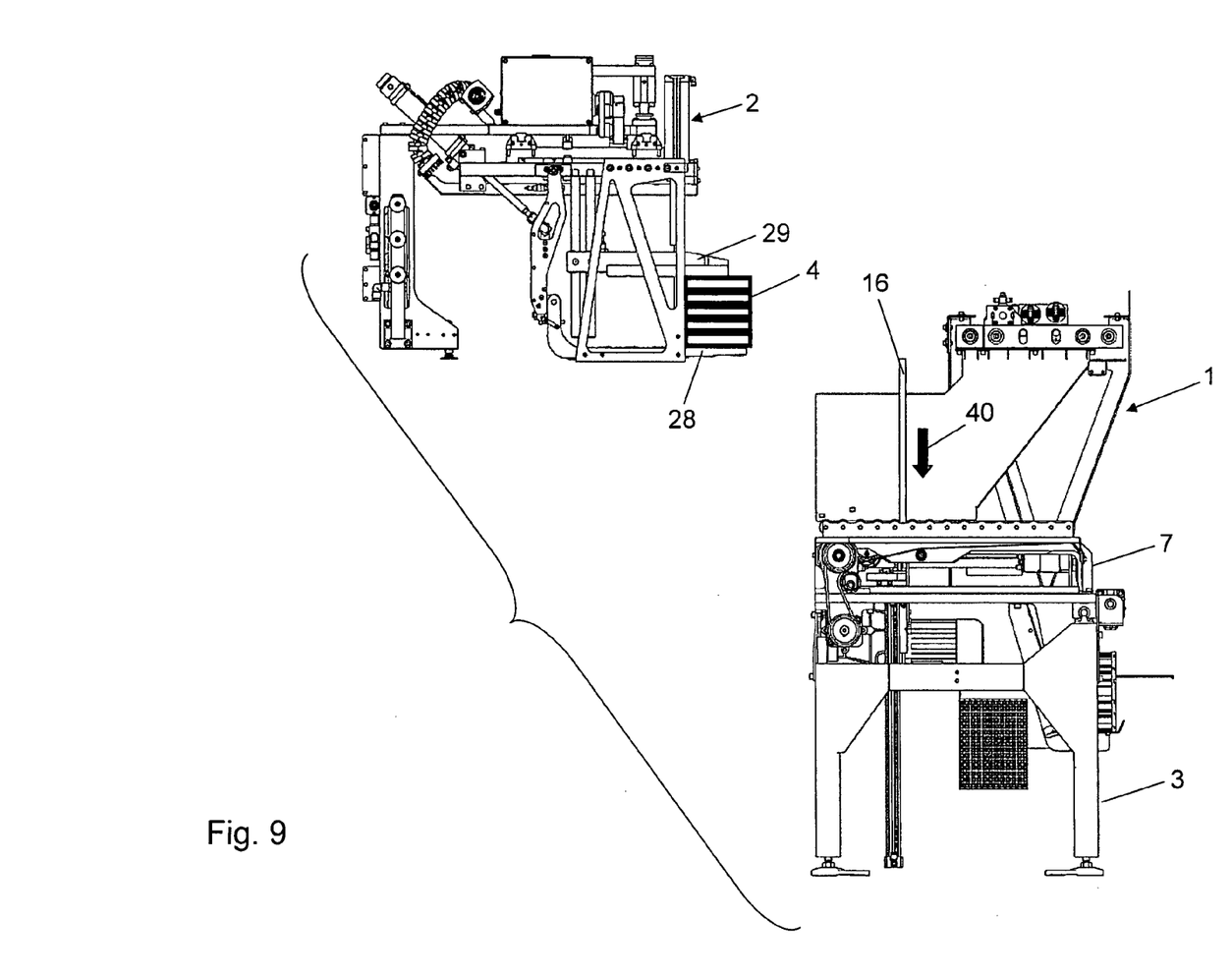

When the two stacks 4 or the single stack 4' has been gripped by the stack gripper 2, it is removed from the infeed station 1, as shown in FIG. 9. The stack gripper 2 is then controlled in such a way that it sets the stacks 4 or the stack 4' down on the pallet 5. For this purpose, the pressing means 29 is raised again, and the fingers 28 are retracted, so that the stack gripper 2 can be moved away from the stacks 4 or the single stack 4' and be readied to pick up additional stacks 4, 4'.

While specific embodiments of the invention have been shown and described in detail to illustrate the inventive principles, it will be understood that the invention may be embodied otherwise without departing from such principles.

I claim:

1. An infeed station and stack gripper of a palletizing system, comprising a carriage supported on a machine frame of the infeed station so as to be movable laterally, a stack conveyor mounted on the carriage for conveying stacks from an infeed position to a transfer position, from where the stacks can each be removed by the stack gripper, the stack conveyor having gaps, at least two stack chambers which are arranged on the carriage and in which the stacks can be centered;

and a control unit, wherein the stack gripper has stop edges, pressing means and fingers that cooperate to grip a stack, wherein a stop element supported on the carriage is assigned to each stack chamber and is movable between a working position and a retracted position, wherein in the working position, the stop elements project into the associated stack chamber in such a way that the stacks can be moved by the step edges of the stack gripper from a forward holding position of the transfer position towards the stop elements so that a rear end of the stack is placed against the stop elements, wherein the stack gripper is positionable and moveable so that the fingers enter the gaps of the stack conveyor, and wherein the stop elements are movable horizontally in or opposite a direction of conveyance of the stacks only to adjust to a format of the stacks but not for moving the stacks.

2. The infeed station stack gripper in accordance with claim 1, wherein the stop elements on the carriage are adjustable in a longitudinal direction of the associated stack conveyor.

3. The infeed station and stack gripper in accordance with claim 1, wherein each of the stop elements has a sensor for monitoring whether they have passed completely over a given stop element, that is in its retracted position.

4. The infeed station and stack gripper in accordance with claim 3, wherein the sensors are each located on an upper end of a stop element, so that the sensors are each directed at the underside of a stack passing overhead.

5. The infeed station and stack gripper in accordance with claim 1, wherein each stop element has at least two rod-like, vertically extending parts that are arranged at a distance from each other.

6. The infeed station and stack gripper in accordance with claim 1, wherein the stop elements are each movable vertically with an actuating cylinder and are horizontally displaceable with a spindle.

7. A method for transferring stacks from an infeed station to a stack gripper including a carriage supported on a machine frame of the infeed station so as to be movable laterally,
 a stack conveyor mounted on the carriage for conveying stacks from an infeed position to a transfer position, from where the stacks can each be removed by the stack gripper, the stack gripper having gaps,
 at least two stack chambers which are arranged on the carriage and in which the stacks can be centered;
 and a control unit, wherein the stack gripper has stop edges, pressing means and fingers that cooperate to grip a stack, wherein a stop element supported on the carriage is assigned to each stack chamber and is movable between a working position and a retracted position, wherein in the working position, the stop elements project into the associated stack chamber in such a way that the stacks can be moved by the stop edges of the stack gripper from a forward holding position of the transfer position towards the stop elements so that a rear end of the stack is placed against the stop elements, wherein the stack gripper is positionable and moveable so that the fingers enter the gaps of the stack conveyor, the method comprising moving the stacks or a single stack by the stack conveyor into a forward holding position where the stop elements are then moved out of the retracted position and into the working position by a certain distance from the rear end of the corresponding stack, and pushing the stacks or stack by the stack gripper towards the stop element or elements until a rear end of the stacks or stack rests against the stop element or elements, and wherein the stop elements are moved horizontally in or opposite a direction of conveyance of the stacks only to adjust to a format of the stacks but do not move the stacks.

8. The method in accordance with claim 7, comprising for picking up at least one stack with two gripping fingers, moving the stack gripper under the stack lodated in the holding position, and pushing it against at least one stop element.

9. The method in accordance with claim 7, wherein the stack conveyor is controlled in such a way that to position the stacks, it is moved in reverse to assist the pushing movement of the stack gripper.

10. The method in accordance with claim 7, wherein a sensor is used to monitor the passage of the stacks over at least one stop element in its retracted position and at least one stop element is moved from the retracted position to the working position due to a sensor signal.

11. The method in accordance with claim 7, wherein the stack gripper comprises a front end and wherein the front end of the stack gripper has at least two stop edges spaced some distance apart and that these stop edges push the stacks or stack against the stop elements.

* * * * *